United States Patent
Horsthuis et al.

(10) Patent No.: US 6,181,845 B1
(45) Date of Patent: Jan. 30, 2001

(54) OPTICAL SWITCH MATRIX

(75) Inventors: Winfried H. G. Horsthuis, Manotick (CA); Peter M. C. De Dobbelaere, San Diego, CA (US)

(73) Assignee: JDS Uniphase Photonics C.V., Arnheim (NL)

( * ) Notice: Under 35 U.S.C. 154(b), the term of this patent shall be extended for 0 days.

(21) Appl. No.: 09/210,548

(22) PCT Filed: Jun. 3, 1997

(86) PCT No.: PCT/EP97/02977

§ 371 Date: Dec. 14, 1998

§ 102(e) Date: Dec. 14, 1998

(87) PCT Pub. No.: WO97/48241

PCT Pub. Date: Dec. 18, 1997

(30) Foreign Application Priority Data

Jun. 14, 1996 (EP) .................................................. 96201657

(51) Int. Cl.[7] .................................................. G02B 6/35
(52) U.S. Cl. .................................................. 385/17; 385/24
(58) Field of Search .................................. 385/15, 16, 17, 385/24, 31, 39, 45, 49, 50

(56) References Cited

U.S. PATENT DOCUMENTS

| 4,943,136 | 7/1990 | Popoff ............................... 350/36.16 |
| 5,259,051 | 11/1993 | Burack et al. ........................... 385/76 |
| 5,729,642 | * 3/1998 | Thaniyavarn ........................... 385/17 |

FOREIGN PATENT DOCUMENTS

| PCT/DE95/01254 | 9/1995 | (WO) | ............................. H04Q/3/52 |
| PCT/EP96/00847 | 2/1996 | (WO) | ................................ G02F/1/35 |
| PCT/EP96/01636 | 4/1996 | (WO) | ............................. G02F/1/313 |
| PCT/EP96/02343 | 5/1996 | (WO) | ............................. G02F/1/313 |
| PCT/EP96/02500 | 6/1996 | (WO) | ................................ G02B/6/12 |

OTHER PUBLICATIONS

"Architectures for Large Nonblocking Optical Space Switches" Ron A. Spanke, IEEE Journal of Quantum Electronics, vol. QE–22, No. 6 Jun. 1986 pp. 964–967.

"Integrated Optics 4×4 switch Matrix with Digital Optical Switches" Granestrand et al. Electronics Letters, Jan. 4th, 1990 vol. 26 No. 1 pp. 4–5.

* cited by examiner

Primary Examiner—John D. Lee
Assistant Examiner—Michelle R. Connelly-Cushwa
(74) Attorney, Agent, or Firm—Lacasse & Associates; Randy W. Lacasse; Kevin E. Greene

(57) ABSTRACT

The invention pertains to an optical switch matrix comprising n input channels, branching means for dividing the input channels up into p branched channels, merging means for merging the p branched channels into m output channels, and optical fibers for connecting the output channels of the branching means with the input channels of the merging means, wherein n, m, and p are natural numbers greater than or equal to 2, and wherein the branching means, the fibers, and the merging means are each attached to a separate substrate or a separate group of substrates. The optical switching matrix according to the invention is very compact and allows efficient use of the materials available for the manufacture thereof.

21 Claims, 1 Drawing Sheet

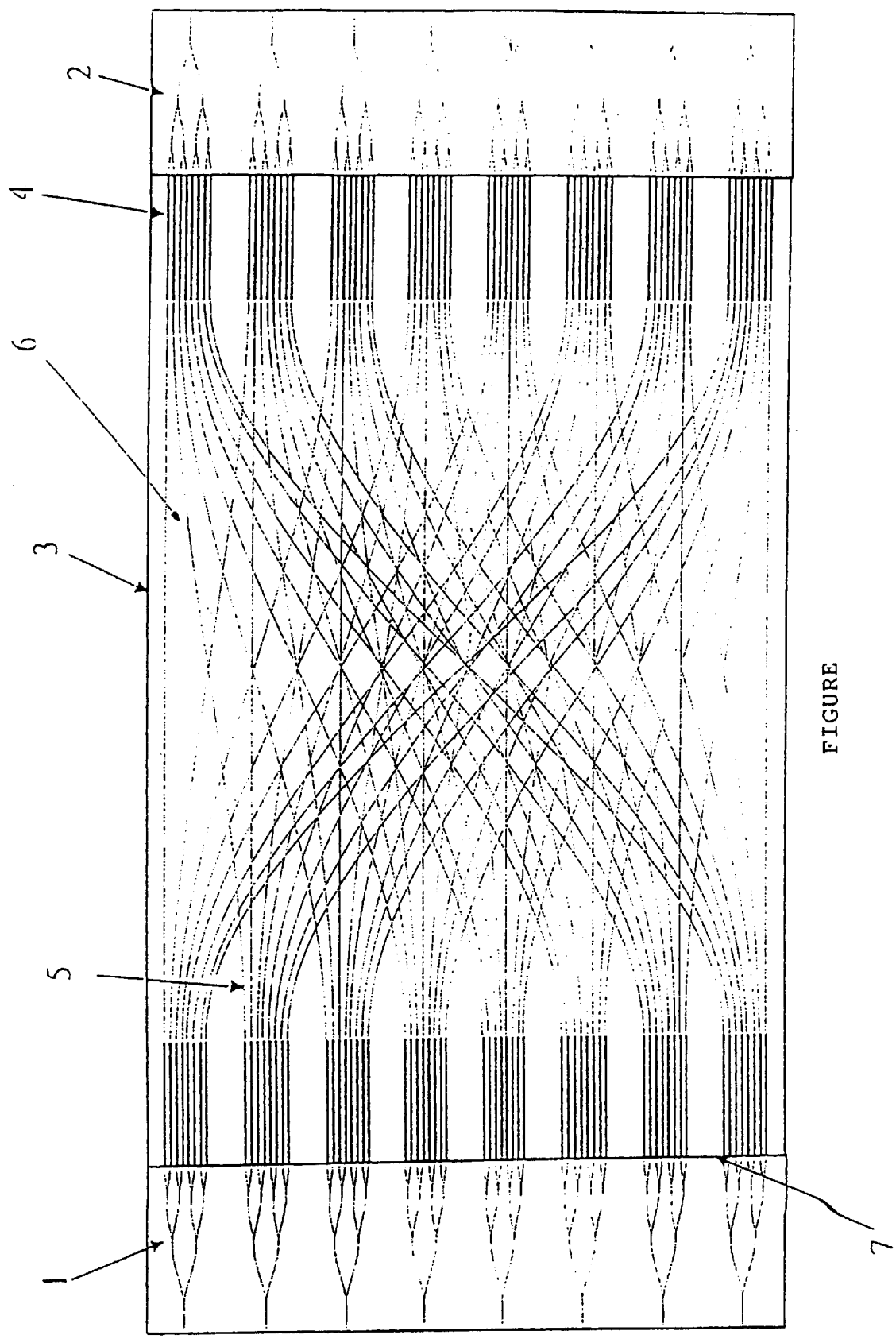
FIGURE

OPTICAL SWITCH MATRIX

FIELD OF THE INVENTION

The invention pertains to an optical switch matrix comprising n input channels, branching means for dividing the input channels up into a total of p branched channels, merging means for merging p branched channels into m output channels, and optical fibres for connecting the output channels of the branching means with the input channels of the merging means, wherein n, m, and p are natural numbers greater than or equal to 2.

BACKGROUND OF THE INVENTION

Such optical switch matrices are known. On Feb. 10, 1995, during a workshop of Eindhoven University of Technology in the Netherlands Siemens presented an 8×8 optical switch matrix named "8×8 Modulaufbau," which consists of an array of sixteen juxtaposed 1×8 switches on a long rectangular InP-substrate and optical fibres (embedded in a product of AT&T called "Optiflex™" and bent through an angle of 180°) for connecting the switches. Eight of said 1×8 switches are each used as an input channel which branches into in eight channels. Each of these branched channels is connected to one of the merging channels of the remaining eight 1×8 switches (or, more accurately, 8×1 switches), in such a manner that an input signal in one of the input channels can be switched to any one of the output channels.

Said optical switch matrix has a length of more than 300 mm and a width of at least 50 mm, which is very large, especially in an industry where small size is, in many cases, of the essence. A reason for these considerable dimensions is that the optical fibres, which are usually made of glass, can only be bent to a certain extent. The minimal bending radius for glass fibres is about 25 mm. If smaller radii are used, the glass fibre may break or the optical loss within the fibre may increase to an unacceptably high level. As mentioned, in said optical switch matrix the fibres are bent through an angle of 180°. Consequently, the minimum width of the matrix exceeds 50 mm.

SUMMARY OF THE INVENTION

The present invention has for its object to provide an n×m optical switch matrix which is relatively small in size. To this end, an optical switch matrix as described in the first paragraph is provided wherein the branching means, the optical fibres (preferably p in all), and the merging means are each attached to a separate substrate or a separate group of substrates, which substrates are optically aligned.

Surprisingly, it has been found that the present invention allows a size reduction of the order of 80%. The use of a separate substrate for the optical fibres enables very efficient placement thereof, resulting in a considerable size reduction both in the longitudinal and the transverse direction, especially if the substrate with the branching means and the substrate with the merging means are on opposite sides of the substrate to which the optical fibres are attached. Further, owing to the compactness and rigidity of the elements of the optical switch matrix according to the invention, said elements can be aligned accurately with relatively little effort and do not suffer from tensions induced by movement of the optical fibres during operation (as can be the case with structures such as "Optiflex™").

Usually, switch matrices are packaged in a hermetically sealed unit to protect them from corrosion. Said small size of the matrices according to the invention allows the use of a single package unit or box for packaging the entire switch matrix. In consequence, only n+m fibres have to be fed through the walls of the package. Up until now, the branching means and the merging means were each packaged in one or more separate boxes, and the optical fibres emerging from these boxes were spliced together one by one. In that case, the total number of fibre feedthroughs amounts to n+m+2p.

For a 8×8 switch matrix, the invention makes it possible to reduce the total number of fibre feedthroughs from 144 (i.e., 8+8+(2×64)) to 16 (i.e., 8+8), which since the hermetic feedthroughs are responsible for the greater part of total packaging costs, is a major advantage. Also, instead of the interconnect fibres and the fibres extending from the merging/branching means being spliced together one by one, the substrates according to the invention (provided with the interconnect fibres and the merging/branching means, respectively) can be optically aligned in a few automated process steps using conventional equipment.

Further, the invention solves another problem inherent to the above mentioned "8×8 Modulaufbau" which resides in the fact that the dimensions of the substrates carrying the switches or optical fibres are, of course, limited by the dimensions of the wafers of which the substrates are made. If, for instance, InP-wafers are used, the maximum length of the InP-substrates is 2 inches at most because InP-wafers have (at present) a maximum diameter of 2 inches. Since 8 1×8 switches need a total length of about 1 inch, the number of juxtaposed 1"switches on a single substrate cannot exceed 16. Consequently, larger matrices, e.g., 16×16 matrices which would comprise 32 juxtaposed switches, cannot be manufactured using the "8×8 Modulaufbau," whereas they can be manufactured using the present invention.

It will be understood that, apart from the above example, the invention allows the construction of larger matrices with at least a double switch capacity irrespective of the material used.

The terms "branching means" and "merging means" include both active means (e.g., switches) and passive means. Since the invention pertains to a switch matrix, the total number (and the position) of the switches in the branching means and the merging means should be such that at least two input channels can selectively be connected (for a certain wavelength) to one of at least two output channels.

Optical switch matrices wherein n (the number of inputs) and m (the number of outputs) are equal or wherein n equals 2m or m/2 are preferred. Such matrices can be mass-produced, are very versatile, and, more importantly, are basic building blocks in telecommunications and Clos networks. Preferred are those optical switch matrices wherein n equals $2^i$, "i" being an integer (preferably in the range of 2–8, at present more preferably 2–5), and/or wherein said branching means and said merging means consist of a cascade or tree of 1×2 and 2×1 switches, respectively.

It should be noted that although it is, in some cases, preferred to integrate all branching or merging means on a single substrate (which allows simple production and optical alignment of the separate substrates), the invention does not exclude the use of more than one substrate for each of said means. For example, a 4×4 matrix comprising 4 branching means (4 1×4 switches) each on a separate substrate, an interconnect chip provided with 16 optical fibres, and 4 merging means (4 4×1 switches) arranged in twos on two substrates, is also within the scope of the present invention. By doing so, defective switches can be disposed of individually instead of in combination with the sound switches on the same substrate. Thus, the production yield is improved.

In a preferred embodiment, the optical fibres are attached to a substrate with at least p grooves on two opposing sides. This can be achieved, for instance, by providing short grooves on both sides or by providing grooves which run the length of the substrate. The substrates can be manufactured using conventional methods and enable automated and accurate placement of the fibres, again using conventional techniques. In principle, the substrates can be made of any material suitable for supporting a polymeric waveguide structure or optical fibres. In connection with the alignment of the optical fibres with the channels of the switches, it is preferred to use rigid materials. Examples are thermoset polymers (in which the desired grooves can be made, e.g., by shaping techniques such as injection moulding), glass, or other inorganic materials such as silicon, alloys consisting for the greater part of silicon, or GaAs and the like. In the last of these materials, grooves can be made by etching techniques known from the semiconductor industry. The grooves preferably are V-shaped, thus providing two facets vis-à-vis which the optical fibres can be kept very tightly in place and allowing most accurate positioning in respect of the waveguide facets.

If use is made of single mode fibres, which have a core diameter of about 10 microns and an outer diameter of about 125 microns, the substrate preferably is a monocrystalline material exhibiting an anisotropic etching characteristic, since such materials allow very accurate definition of the dimensions of the V-grooves which will contain the fibres. In this respect silicon, alloys consisting for the greater part of silicon, and indium phosphide are examples of suitable and preferred substrate materials.

In order to allow very accurate alignment of the optical fibres with the inputs and outputs of the optical switches, at least the substrate to which the optical fibres are attached has a surface flatness of less than 3 microns, preferably less than 2 microns, at least near the endfaces. This can, for instance, be achieved by using a substrate of which the entire surface meets said flatness, by polishing the substrate near the endfaces, or by glueing pieces of material having said flatness to the substrate, again at least near the endfaces of the substrate.

The aforementioned optical switches can, for instance, be thermo-optical (TO), electro-optical (EO), magneto-optical (MO), acousto-optical (AO) or mechano-optical switches. Suitable examples of thermo-optical switches are described in European patent applications 95200965.2, 95201460.3, and 95201762.2, all in the name of Akzo Nobel NV. The invention of course is not restricted to certain optical materials. However, for an example of a suitable material reference is made to European patent application 95201761.4 in the name of Akzo Nobel.

It is noted that in R. A. Spanke, "Architectures for Large Nonblocking Optical Space Switches," *IEEE Journal of Quantum Electronics*, Vol. QE-22, No. 6 (June 1986), 964–967 a drawing is shown of an n×m optical switch matrix wherein splitter and combiner means are in a direct line. The drawing is of a purely schematic nature and does not suggest the use of a separate substrate for the optical interconnect fibres, which substrate is essential to the present invention.

P. Granestand, et al., "Integrated Optics 4×4 Switch Matrix with Digital Optical Switches," *Electronic Letters*, Vol. 26, No.1, Jan. 4th 1990, discloses a 4×4 optical switch matrix wherein all the elements, i.e. 1×4 switches and interconnect waveguides, are built on a single substrate.

WO 96/08932 describes an 8×8 optical switch matrix only in principle, the actual construction of the matrix is not disclosed.

The invention will now be illustrated by way of an unlimitative example.

BRIEF DESCRIPTION OF THE FIGURE

The FIGURE shows an optical switch matrix in accordance with the invention having an input chip and an output chip composed of 1×n switches coupled to an interconnect chip between them.

DETAILED DESCRIPTION OF A PREFERRED EMBODIMENT

The FIGURE shows two chips (1,2) each provided with eight 1×8 thermo-optical switches (ex Akzo Nobel, type Beambox Technology; length: 50 mm, width: 27 mm), an "input" chip (1) and an "output" chip (2). An interconnect chip (3) (length: 30 mm, width: 27 mm) is made of silicon 100 and is provided with 64 V-grooves (4) (obtained by anisotropic etching with KOH-IPA etchant) spaced 250 $\mu$m apart on both of its short sides.

To obtain the interconnect chip (3) single mode optical fibres (5) (ex Corning), of which the acrylate coating is removed only in the areas which are intended to be placed in the V-grooves (4), are mounted on the substrate (6) as depicted in the FIGURE and fixed in the V-grooves with a UV-curing adhesive. A glass plate provided with a UV-curing adhesive on one side is placed on top of the fibres and the thus obtained stack of glass plate, optical fibres (5), and substrate (6) is cured and then diced in one step so as to obtain the endfaces (7) of the interconnect chip (3).

Subsequently, the chips (1,2) provided with the 1×8 switches and the interconnect chip (3) are optically aligned in a conventional manner (active alignment) and fixed.

As is clear from the above Example, the obtained 8×8 optical switch matrix is extremely compact. Further, none of the optical fibres (5) have a bending radius smaller than 25 mm.

What is claimed is:

1. An optical switch matrix comprising n input channels, branching means for dividing the input channels up into a total of p branched channels, merging means for merging p branched channels into m output channels, and overlapping optical fibres having non-intersecting isolated cores for connecting output channels of the branching means with input channels of the merging means, wherein n, m, and p are natural numbers greater than or equal to 9, characterised in that the branching means, the fibres, and the merging means are each attached to a separate substrate or a separate group of substrates.

2. An optical switch matrix according to claim 1, characterised in that n equals m.

3. An optical switch matrix according to claim 2, characterised in that n equals 2i, wherein i is an integer.

4. An optical switch matrix according to claim 3, characterised in that the branching means and the merging means consist of a tree of 1×2 and 2×1 switches, respectively.

5. An optical switch matrix according to claim 3, characterised in that the optical fibres are attached to a substrate with grooves on two opposing sides.

6. An optical switch matrix according to claim 5, characterised in that the substrate for the optical fibres is made of silicon or an alloy consisting for the greater part of silicon.

7. An optical switch matrix according to claim 6, characterised in that at least the substrate to which the optical fibres are attached has a surface flatness of less than 3 microns.

8. An optical switch matrix according to claim 3, characterised in that at least the substrate to which the optical fibres are attached has a surface flatness of less than 3 microns.

9. An optical switch matrix according to claim 2, characterised in that the branching means and the merging means consist of a tree of 1×2 and 2×1 switches, respectively.

10. An optical switch matrix according to claim 9, characterised in that at least the substrate to which the optical fibres are attached has a surface flatness of less than 3 microns.

11. An optical switch matrix according to claim 2, characterised in that the optical fibres are attached to a substrate with grooves on two opposing sides.

12. An optical switch matrix according to claim 11, characterised in that the substrate for the optical fibres is made of silicon or an alloy consisting for the greater part of silicon.

13. An optical switch matrix according to claim 2, characterised in that at least the substrate to which the optical fibres are attached has a surface flatness of less than 3 microns.

14. An optical switch matrix according to claim 1, characterised in that the branching means and the merging means consist of a tree of 1×2 and 2×1 switches, respectively.

15. An optical switch matrix according to claim 14, characterised in that the optical fibres are attached to a substrate with grooves on two opposing sides.

16. An optical switch matrix according to claim 1, characterised in that the optical fibres are attached to a substrate with grooves on two opposing sides.

17. An optical switch matrix according to claim 16, characterised in that at least the substrate to which the optical fibres are attached has a surface flatness of less than 3 microns.

18. An optical switch matrix according to claim 16, characterised in that the substrate for the optical fibres is made of silicon or an alloy consisting for the greater part of silicon.

19. An optical switch matrix according to claim 1, characterised in that at least the substrate to which the optical fibres are attached has a surface flatness of less than 3 microns.

20. An optical switch matrix comprising n input channels, branching means for dividing the input channels up into a total of p branched channels, merging means for merging p branched channels into m output channels, and overlapping optical fibres having non-intersecting isolated cores for connecting output channels of the branching means with input channels of the merging means, wherein n, m, and p are natural numbers greater than or equal to 2, characterised in that the branching means, the fibres, and the merging means are each attached to a separate substrate or a separate group of substrates, the substrate attached to the fibres being directly coupled with the substrate attached to the branching means and the substrate attached to the merging means.

21. An optical switch matrix comprising:

a first monolithic substrate having waveguides disposed therein for branching optical signals propagating therein, a second monolithic substrate having waveguides disposed therein for merging received optical signals, and a fibre supporting substrate supporting and for receiving overlapping optical fibres having non-intersecting isolated cores and for coupling signals between waveguides within the first monolithic substrate and the second monolithic substrate, the first and second monolithic substrates being directly coupled with the fibre supporting substrate.

* * * * *